United States Patent [19]

Gonzalez

[11] Patent Number: 5,651,879
[45] Date of Patent: Jul. 29, 1997

[54] CELL FOR TREATING A LIQUID MEDIUM BY MEANS OF FLOTATION

[76] Inventor: Pierre Gonzalez, La Croix, Lagorce, F-33230 Coutras, France

[21] Appl. No.: 605,419

[22] Filed: Feb. 22, 1996

[30] Foreign Application Priority Data

Feb. 23, 1995 [FR] France ................................ 95 02089

[51] Int. Cl.$^6$ ................ B03D 1/24; B04C 5/04
[52] U.S. Cl. ............... 209/170; 209/725; 209/730; 209/734; 210/221.2; 210/512.1; 261/76; 261/123; 261/124; 261/DIG. 75; 162/4
[58] Field of Search ...................... 209/170, 730, 209/725, 734; 210/221.2, 221.1, 512.1; 261/76, 77, DIG. 75, 64.1, 28, 123, 124; 162/4

[56] References Cited

U.S. PATENT DOCUMENTS

| | | |
|---|---|---|
| 3,747,757 | 7/1973 | Kolthoff . |
| 4,014,961 | 3/1977 | Popov . |
| 4,331,534 | 5/1982 | Barnscheidt . |
| 4,620,926 | 11/1986 | Linck . |

*Primary Examiner*—Thomas M. Lithgow
*Attorney, Agent, or Firm*—William A. Drucker

[57] ABSTRACT

The cell 1 includes an upper cylindrical chamber 2 comprising at its center over its entire height a vertical ink removal pipe 4. A lower lateral pipe 9 receives via an opening 10 a paper pulp feed diluted in water and is fed with air from an upper pipe 12. Injectors placed on the pipe 9 inject the paper pulp and air into the chamber 2. Each injector has the shape of a tube with a constant diameter and opens at its outlet extremity through about twelve honeycomb-shaped orifices, thus ensuring a satisfactory dispersion of the air. The air bubbles lift up the ink particles so as to form a foam evacuated by the pipe 4.

7 Claims, 4 Drawing Sheets

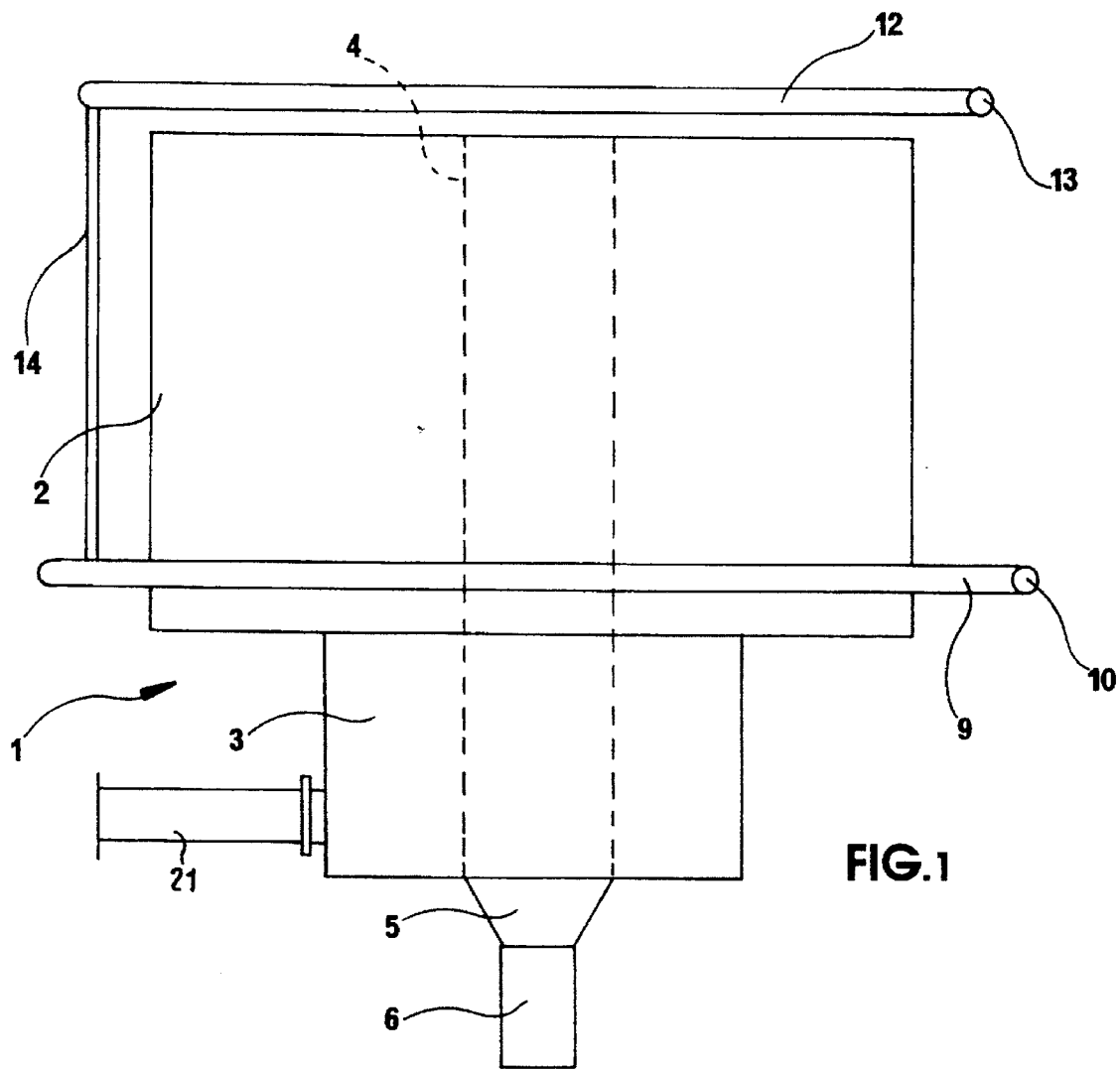
FIG. 1
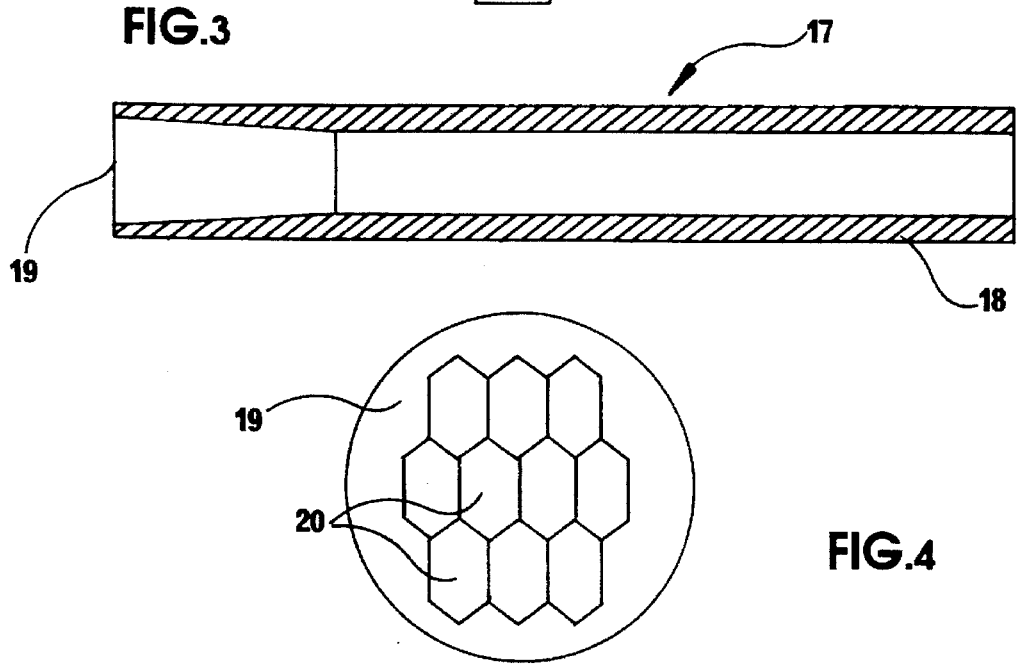
FIG. 3
FIG. 4

1

CELL FOR TREATING A LIQUID MEDIUM BY MEANS OF FLOTATION

BACKGROUND OF THE INVENTION

1. Field of the Invention

The present invention concerns a cell for treating a liquid medium by means of flotation.

It is applicable in particular, but not exclusively, to removing ink from the paper pulp and for treating paper mill residual water.

2. Description of the Prior-Art

The flotation ink-removal cells currently available on the market are of the type in which the paper pulp is projected into the cell by a set of injectors and rotates at a relatively high speed inside the cell. Fresh air is introduced by the injectors so as to create inside the cell air bubbles which shall make the ink particles rise.

These known type of ink-removal cells by means of flotation do have the drawback in that the dwell time of the paper pulp inside the cell is too short to obtain suitable ink removal. Furthermore, excessive agitation existing inside these cells causes flocculence resulting in the loss of fibres.

In known flotation residual water treatment systems, an air pressurisation sends air under pressure mixed with water into the flotation cell. The surface impurities are removed with the aid of a rotating bucket joined to the centre of the cell.

These known residual water treatment systems have the drawback in that the water circulation speed inside the cell is too high to enable the water to be effectively cleaned.

The present invention is able to resolve the above-mentioned drawbacks exhibited by the known treatment cells by a treatment cell acting by means of flotation which, by significantly reducing the circulation speed of the liquid medium to be treated inside the cell, is able to substantially improve the quality of treatment of this liquid medium.

SUMMARY OF THE INVENTION

According to the invention, the cell for treating a liquid medium is of the type including at least one cylindrical chamber inside which the liquid medium to be treated and air are introduced by injectors, said air being intended to make the particles or waste contained in the liquid medium rise up to the surface so as to remove them. It is characterised in that said injectors have a tubular body with an approximately constant diameter and a set of honeycomb-shaped outlet orifices.

By means of this structure of injectors, the air injected only undergoes a limited thrust and is suitably dispersed so as to be distributed homogeneously inside the liquid medium when moving inside the cell.

The cell of the invention is accordingly provided with dimensions much larger than conventional cells and the circulation speed inside the cell is highly reduced, indeed by about five times, which enables any treatment to be much more effective.

The feeding of the injectors with air is carried out from regulation valves which avoid swirls inside the cell and thus a loss of fibres when removing ink from paper pulp. Moreover, the vertical pipe used to remove the air bubbles charged with ink is ended by a fibre recovery element.

So as to clearly understand the device of the invention, there now follows non-restrictive examples of two preferred embodiments with reference to the accompanying diagrammatic drawing on which:

BRIEF DESCRIPTION OF THE DRAWING

FIG. 1 is a front view of a floating ink-removal cell conforming to the present invention;

FIG. 3 is a longitudinal vertical cutaway view of an injector equipping the ink-removal cell of FIGS. 1 and 2;

FIG. 4 is an end view of the injector of FIG. 3;

DESCRIPTION OF THE PREFERRED EMBODIMENTS

Figure 2:
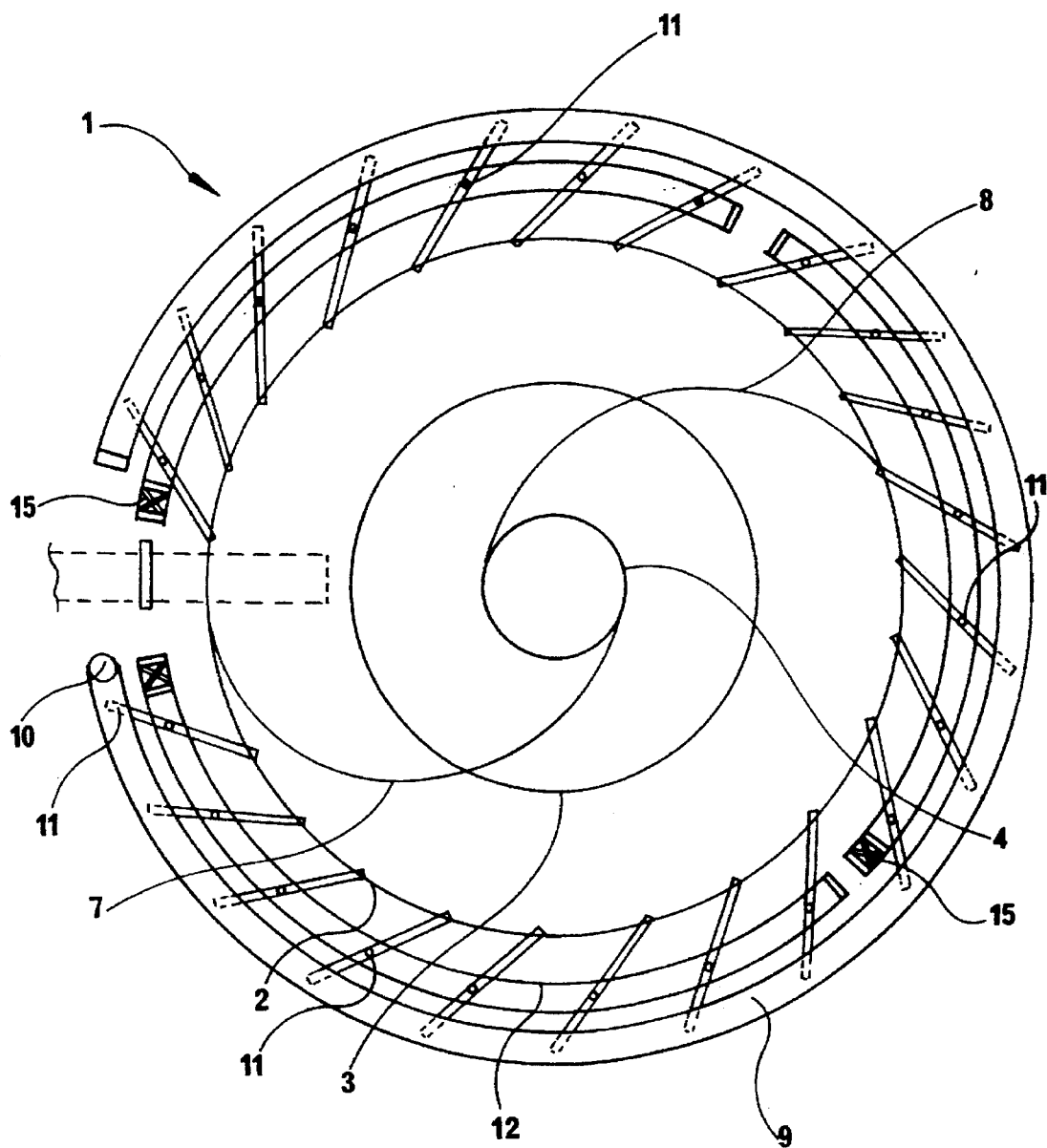
FIG. 2 is a bird's eye view of the cell of FIG. 1.

According to a first embodiment of the present invention, FIGS. 1 to 4 generally show at 1 an ink-removal cell which includes an upper cylindrical chamber 2 followed by a lower cylindrical chamber 3 sharing the same vertical axis. The cell 1 comprises at its centre and over its entire height a vertical ink-removal pipe 4 which is open at its upper extremity and is continued below the lower chamber 3 by a slanted portion 5 being extended by a fibre recover element 6. This ink-removal cell 1 has dimensions much larger than those of conventional ink-removal cells and, by way of example, its upper chamber 2 may have a diameter of about 5.50 meters and a height of about 4 meters, whereas its lower chamber 3 may have a diameter of about 3 meters and a height of about 2 meters, its central vertical pipe having a diameter of about 1 meter.

Towards its upper extremity, the vertical pipe 4 is integral with one extremity of two bending inward walls 7, 8 symmetrical with respect to the centre of the tank and extending radially and whose other extremities are integral with the lower face of the wall of the upper chamber 2. As shall be seen later, these walls 7, 8 are used to guide towards the inside of the pipe 4 the foam charged with ink located on the surface of the paper pulp circulating in the tank 1.

A lateral pipe 9 externally goes round the upper cylindrical chamber 2 at the lower portion of the latter and is fed with paper pulp diluted by an opening 10 under the action of a distribution pump.

A pipe 12 equipped with three air inlets 13 is disposed above the upper chamber 2 and this pipe 12 communicates by vertical tubes 14 and regulation valves 15 with the lateral pipe 9. This pipe, by means of the injectors, ensures the projection of a mixture of paper pulp and air into the chamber 2.

According to the invention, each injector 11 ensuring the projection of paper pulp and air has the shape of a tube 18 having a constant diameter over its entire length and opens at its outer extremity 19 by about twelve honeycomb-shaped orifices.

This structure of injectors 11 ensures a smaller thrust and better distributed with respect to conventional injectors, whilst allowing for a more satisfactory dispersion of air in the paper pulp and thus an improved lifting of the ink with an extremely small loss of fibres.

A pipe 21 at the lower portion of the lower cylindrical chamber 3 ensures the leaving of the paper pulp after the ink has been removed.

The functioning of the device is immediately understandable according to the preceding description.

Paper pulp before its ink is removed and diluted in water, for example at a 1% concentration, arrives via the pipe 9 and is introduced into the cell 1 mixed with the air by the injectors 11. Thus, the air is suitably dispersed in the paper pulp.

The air, water and paper pulp rotate in the cell 1 under the effect of the thrust provided by the injectors 11 and by the pulp distribution pump at a speed about five times lower with respect to conventional cells.

The ink particles contained in the paper pulp are lifted up by the air bubbles and, by virtue of the addition of chemical substances, such as soaps or phosphates, form a foam on the surface which rotates in the same direction as the pulp. This foam is stopped by the walls 7, 8 forming barriers and is orientated towards the central pipe 4 forming a chute.

At the bottom of the central pipe 4, the evacuated foam falls onto the slanted plane 5 where a liquid pulverisation (not shown on the drawing) makes it possible to separate the fibres, brought together in the recovery element 6, from the ink.

Figure 5:
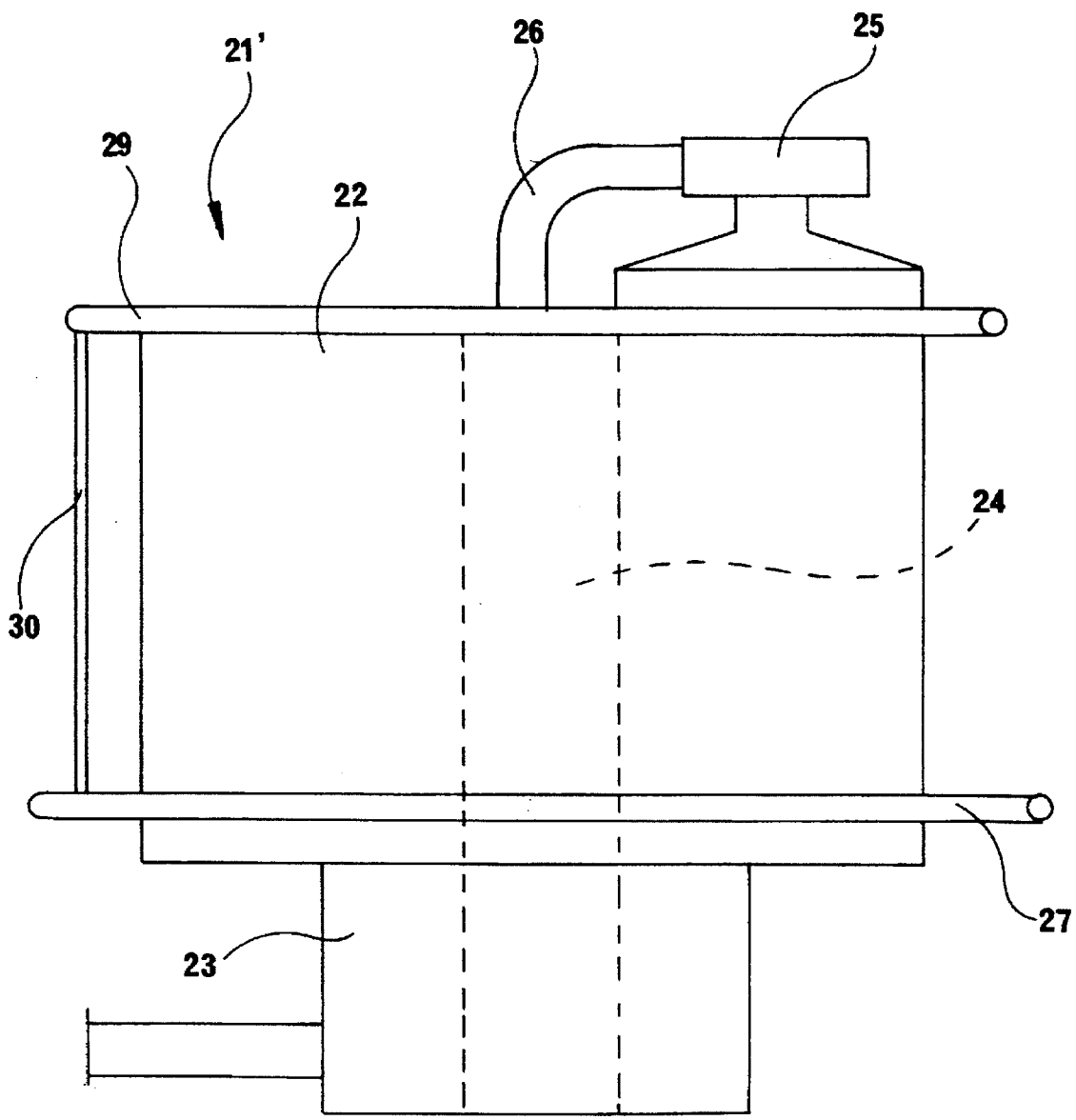
FIG. 5 is a front view of a paper pulp residual water treatment cell according to a second embodiment of the invention.
Figure 6:
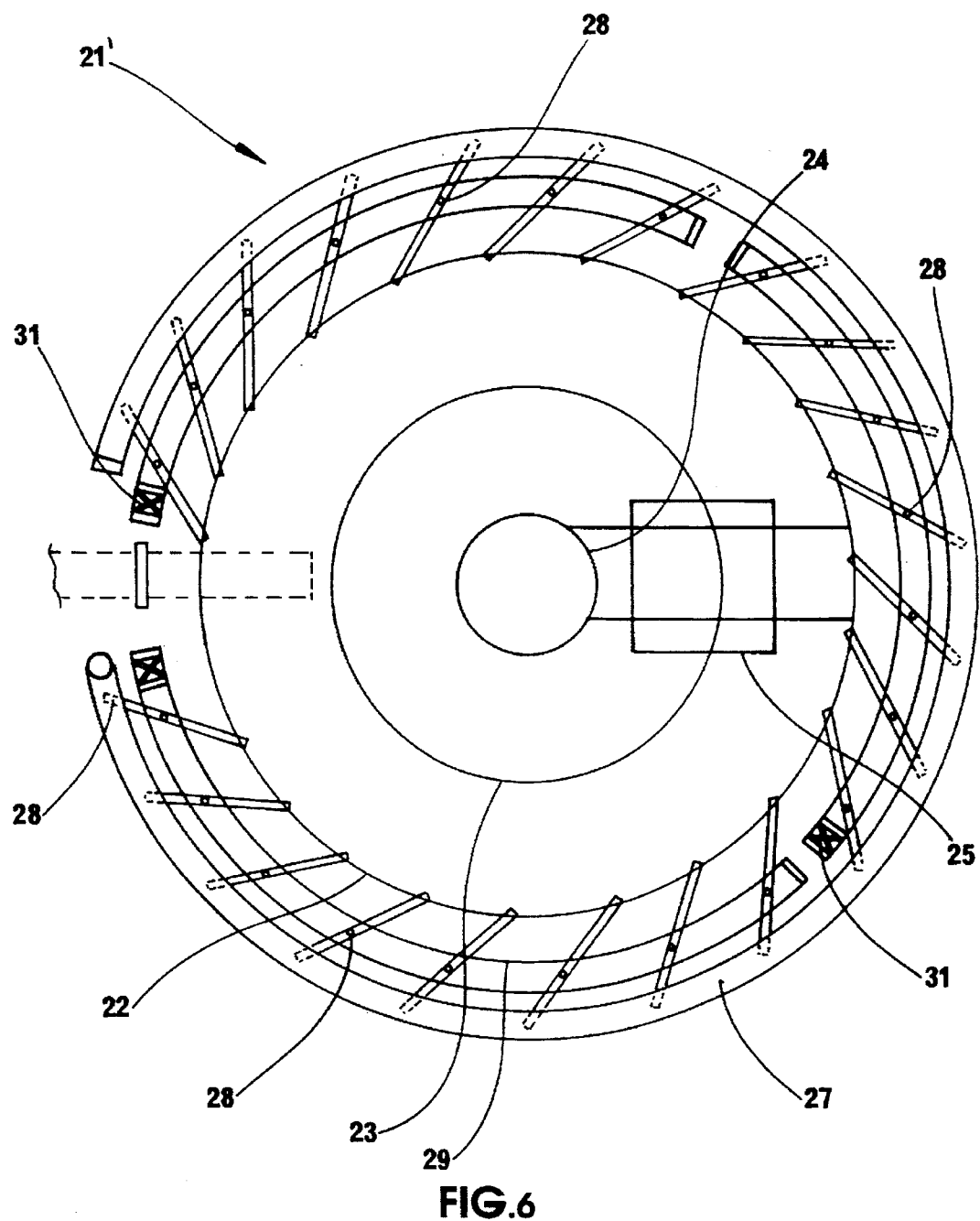
FIG. 6 is a larger scale bird's eye view of the cell of FIG. 5.

FIGS. 5 and 6 show a second embodiment of the invention applicable to the treatment of the paper mill residual water.

The treatment cell 21 with upper 22 and lower 23 cylindrical chambers is at all points similar to the one shown on FIGS. 1 and 2. A vertical central pipe 24 ensures the removal of the waste substances rising to the surface from the treated water.

The cell 21, whose dimensions are of the same order as those shown on FIGS. 1 and 2, comprise on half of its horizontal surface a suction system 25 comprising, for example, a turbine (not shown on the drawing), which includes a suction opening acting flush with the surface of the water inside the cell so as to suck up the waste substances located on the surface and evacuate them by means of a bent pipe 26 and by the vertical central pipe 24.

As in the cell of FIGS. 1 and 2, injection into the cell 21 of residual water and air is provided by injectors identical to the one shown on FIG. 3, that is having the shape of a tube with a constant diameter over its entire length and opening at its outlet orifice by about twelve honeycomb-shaped orifices. A lower peripheral pipe 27 feeds these injectors (shown at 28 on FIG. 6) with the residual water to be treated, whilst an upper pipe 29 equipped with air intakes feeds the injectors 28 via vertical tubes 30 and regulation valves 31.

As seen earlier, this structure of injectors 28 provides a weaker thrust and provides better distribution of the air in the residual water whilst permitting a slower circulation of the water inside the cell and provides greater effectiveness of the air ensuring the rising of waste substances to the surface of the water.

The suction system 25, which has a suction opening positioned flush with the water, ensures the evacuation of these waste via the bent pipe 26 and the central pipe 24.

It is to be noted that the above description has been given by way of non-restrictive example and constructive additions or modifications could be made to it without departing from the context of the invention.

What is claimed is:

1. A cell for treating liquid mediums by means of floating, which comprises an upper cylindrical chamber, a lower cylindrical chamber extending from the upper cylindrical chamber at a bottom portion thereof, said upper and lower cylindrical chambers having a same vertical axis, injectors disposed at a lower portion of said upper cylindrical chamber to introduce into said upper cylindrical chamber a liquid medium to be treated and air, said air being intended to make particles or waste contained in the liquid medium rise up to the surface of the liquid medium so as to remove them, said injectors each having a tubular body with an approximately constant internal diameter and a set of honeycomb-shaped outlet orifices so as to ensure a suitable dispersion of said air which is homogeneously distributed inside the liquid medium when moving in the cell, and said lower cylindrical chamber communicating at its lower portion with a pipe ensuring leaving of the liquid medium after said particles or waste have been removed.

2. A cell according to claim 1, wherein the number of said outlet orifices is about twelve.

3. A cell according to claim 1, wherein regulation valves feed said injectors with air from air inlets, preventing turbulence to occur inside said upper cylindrical chamber.

4. A cell according to claim 1, wherein said cylindrical chamber has a diameter of about 5 meters and a height of about 4 metres.

5. A cell according to claim 1 for removing ink from paper pulp, wherein a vertical pipe forming a chute and ended by a fibre recovery element evacuates ink particles driven to the surface of the paper pulp by air bubbles.

6. A cell according to claim 1 for treating paper mill residual water, which comprises a vertical central pipe through which are evacuated waste substances driven to the surface of the residual water by air bubbles.

7. A cell according to claim 6, which comprises a suction opening positioned flush with the residual water for sucking up waste substances located on the surface of the residual water.

* * * * *